United States Patent
Gellert et al.

(10) Patent No.: US 6,440,350 B1
(45) Date of Patent: Aug. 27, 2002

(54) APPARATUS AND METHOD FOR MULTI-LAYER INJECTION MOLDING

(75) Inventors: Jobst U. Gellert, Georgetown; Denis L. Babin, Acton; Itsuto Nakanishi, Toronto, all of (CA)

(73) Assignee: Mold-Masters Limited (CA)

( * ) Notice: Subject to any disclaimer, the term of this patent is extended or adjusted under 35 U.S.C. 154(b) by 0 days.

(21) Appl. No.: 09/329,036

(22) Filed: Jun. 9, 1999

Related U.S. Application Data

(63) Continuation-in-part of application No. 09/274,443, filed on Mar. 22, 1999, and a continuation-in-part of application No. 09/271,835, filed on Mar. 18, 1999.

(51) Int. Cl.[7] .......................... B29C 45/20; B29C 45/76
(52) U.S. Cl. .............................. 264/328.1; 264/328.8; 425/130; 425/564; 425/573
(58) Field of Search ............... 425/130, 562, 425/563, 564, 565, 566, 573; 264/328.1, 328.8

(56) References Cited

U.S. PATENT DOCUMENTS

| | | | |
|---|---|---|---|
| 3,947,177 A | 3/1976 | Eckardt | 425/130 |
| 4,026,518 A | 5/1977 | Gellert | 251/330 |
| 4,035,466 A | 7/1977 | Langecker | 264/328 |
| 4,082,512 A | 4/1978 | Wingard et al. | 23/252 |
| 4,174,413 A | 11/1979 | Yasuike | 428/35 |
| 4,376,625 A | 3/1983 | Eckardt | 425/564 |
| 4,433,969 A | 2/1984 | Gellert | 425/548 |
| 4,436,778 A | 3/1984 | Dugal | 428/36 |
| 4,472,131 A | 9/1984 | Ryder | 425/526 |
| 4,497,621 A | 2/1985 | Kudert et al. | 425/145 |
| 4,525,134 A | 6/1985 | McHenry et al. | 425/130 |
| 4,526,821 A | 7/1985 | McHenry et al. | 428/35 |
| 4,541,982 A | 9/1985 | Upmeier | 264/349 |
| 4,542,054 A | 9/1985 | Fillmann | 428/68 |
| 4,550,043 A | 10/1985 | Beck | 428/36 |

(List continued on next page.)

FOREIGN PATENT DOCUMENTS

| | | | |
|---|---|---|---|
| CA | 1165525 A | 4/1984 | B29F/1/03 |
| DE | 3201710 A | 8/1982 | B29F/1/022 |
| EP | 0 374 247 A1 | 6/1990 | B29C/45/20 |
| EP | 0 688 651 A1 | 12/1996 | B29C/45/04 |
| EP | 0 768 163 A1 | 4/1997 | B29C/45/16 |

(List continued on next page.)

OTHER PUBLICATIONS

International Search Report dated Jun. 19, 2000, for PCT/IB00/00305.
"High Performance Polyester Packaging for Foods & Beverages," *Technologies*, 1996, pp. 42–70.
International Search Report dated Jun. 21, 2000.

*Primary Examiner*—Robert Davis
*Assistant Examiner*—Emmanuel Luk
(74) *Attorney, Agent, or Firm*—McDonnell Boehnen Hulbert & Berghoff

(57) ABSTRACT

An apparatus and method for injection molding includes a first melt passage for the flow of a first material, and a second melt passage in communication with the first melt passage for the flow of a second material. The apparatus and method for injection molding also includes a valve pin that passes through the second melt passage. The valve pin has a first portion allowing the flow of the second material, but not the first material, through the second melt passage, and a second portion restricting the flow of the first material and the second material through the second melt passage. The valve pin may also be used to restrict material flow from a melt channel into a cavity. In addition, a back-flow control valve may be combined with a melt passage of the apparatus and method for injection molding. The back-flow control valve has a first portion for permitting flow of material through the melt passage, and a second portion for restricting flow of material through the melt passage.

20 Claims, 12 Drawing Sheets

U.S. PATENT DOCUMENTS

| | | | |
|---|---|---|---|
| 4,568,261 A | 2/1986 | McHenry et al. | 425/145 |
| 4,609,516 A | 9/1986 | Krishnakumar et al. | 264/255 |
| 4,615,925 A | 10/1986 | Nilsson | 428/35 |
| 4,646,925 A | 3/1987 | Nohara | 215/1 C |
| 4,657,496 A | 4/1987 | Ozeki et al. | 425/130 |
| 4,701,292 A | 10/1987 | Valyi | 264/255 |
| 4,710,118 A | 12/1987 | Krishnakumar et al. | 425/130 |
| 4,715,802 A | 12/1987 | Arai | 425/130 |
| 4,717,324 A | 1/1988 | Schad et al. | 425/130 |
| 4,728,549 A | 3/1988 | Shimizu | 428/35 |
| 4,740,151 A | 4/1988 | Schmidt et al. | 425/549 |
| 4,743,479 A | 5/1988 | Nakamura et al. | 428/35 |
| 4,744,742 A | 5/1988 | Aoki | 425/126.1 |
| 4,774,047 A | 9/1988 | Nakamura et al. | 264/513 |
| 4,775,308 A | 10/1988 | Schad et al. | 425/130 |
| 4,781,954 A | 11/1988 | Krishnakumar et al. | 428/35 |
| 4,808,101 A | 2/1989 | Schad et al. | 425/130 |
| 4,847,129 A | 7/1989 | Collette et al. | 428/35.7 |
| 4,863,369 A | 9/1989 | Schad et al. | 425/547 |
| 4,863,665 A | 9/1989 | Schad et al. | 264/255 |
| 4,892,699 A | 1/1990 | Kudert et al. | 264/328.8 |
| 4,895,504 A | 1/1990 | Kudert et al. | 425/133.1 |
| 4,910,054 A | 3/1990 | Collette et al. | 428/35.7 |
| 4,923,723 A | 5/1990 | Collette et al. | 428/35.7 |
| 4,931,234 A | 6/1990 | Schad et al. | 264/40.1 |
| 4,932,858 A | 6/1990 | Gellert et al. | 425/564 |
| 4,934,915 A | 6/1990 | Kudert et al. | 425/132 |
| 4,944,909 A | 7/1990 | Eckardt et al. | 264/255 |
| 4,950,143 A | 8/1990 | Krishnakumar et al. | 425/130 |
| 4,954,376 A | 9/1990 | Krishnakumar et al. | 428/35.7 |
| 4,957,682 A | 9/1990 | Kobayashi et al. | 264/255 |
| 4,965,028 A | 10/1990 | Maus et al. | 264/297.2 |
| 4,978,493 A | 12/1990 | Kersemakers et al. | 264/255 |
| 4,990,301 A | 2/1991 | Krishnakumar | 264/513 |
| 4,994,313 A | 2/1991 | Shimizu | 428/36.7 |
| 5,022,846 A | 6/1991 | Schmidt | 425/564 |
| 5,028,226 A | 7/1991 | De'ath et al. | 425/130 |
| 5,030,077 A | 7/1991 | Orimoto et al. | 425/130 |
| 5,032,341 A | 7/1991 | Krishnakumar et al. | 264/255 |
| 5,040,963 A | 8/1991 | Beck et al. | 425/130 |
| 5,049,345 A | 9/1991 | Collette et al. | 264/255 |
| 5,051,227 A | 9/1991 | Brun, Jr. et al. | 264/537 |
| 5,077,111 A | 12/1991 | Collette | 428/36.7 |
| 5,093,053 A | 3/1992 | Eckardt et al. | 264/45.1 |
| 5,094,603 A | 3/1992 | Gellert | 425/130 |
| 5,098,274 A | 3/1992 | Krishnakumar | 425/133.1 |
| 5,106,284 A | 4/1992 | Kobayashi et al. | 425/130 |
| 5,125,817 A | 6/1992 | Yamachika | 425/130 |
| 5,131,830 A | 7/1992 | Orimoto et al. | 425/130 |
| 5,135,377 A | 8/1992 | Gellert | 425/130 |
| 5,141,695 A | 8/1992 | Nakamura | 264/255 |
| 5,143,733 A | 9/1992 | Von Buren et al. | 425/130 |
| 5,151,025 A | 9/1992 | Müller | 425/199 |
| 5,162,121 A | 11/1992 | Kawaguchi et al. | 425/130 |
| 5,200,207 A | 4/1993 | Akselrud et al. | 425/557 |
| 5,202,074 A | 4/1993 | Schrenk et al. | 264/241 |
| 5,215,762 A | 6/1993 | Eder et al. | 425/130 |
| 5,221,507 A | 6/1993 | Beck et al. | 264/255 |
| 5,223,275 A | 6/1993 | Gellert | 425/130 |
| 5,252,268 A | 10/1993 | Ohno | 264/40.7 |
| 5,260,012 A | 11/1993 | Arnott | 264/69 |
| 5,262,119 A | 11/1993 | Smith | 264/513 |
| RE34,552 E | 2/1994 | Krishnakumar et al. | 438/35.7 |
| 5,288,451 A | 2/1994 | Schad | 264/328.8 |
| 5,301,838 A | 4/1994 | Schmidt et al. | 222/95 |
| 5,380,479 A | 1/1995 | Schrenk et al. | 264/241 |
| 5,387,099 A | 2/1995 | Gellert | 425/564 |
| 5,407,629 A | 4/1995 | Schmidt et al. | 264/512 |
| 5,441,400 A * | 8/1995 | Zeiger | 425/562 |
| 5,498,150 A | 3/1996 | Check | 425/526 |
| 5,501,593 A | 3/1996 | Marcus | 425/547 |
| 5,523,045 A * | 6/1996 | Kudert et al. | 264/513 |
| 5,573,791 A | 11/1996 | Marcus | 425/523 |
| 5,582,788 A | 12/1996 | Collette et al. | 264/297 |
| 5,582,851 A | 12/1996 | Hofstetter et al. | 425/562 |
| 5,589,130 A | 12/1996 | Takada et al. | 264/537 |
| 5,614,233 A | 3/1997 | Gellert | 425/549 |
| 5,628,950 A | 5/1997 | Schrenk et al. | 264/241 |
| 5,628,957 A | 5/1997 | Collette et al. | 264/512 |
| 5,645,786 A | 7/1997 | Okada et al. | 264/255 |
| 5,650,178 A | 7/1997 | Bemis et al. | 425/130 |
| 5,651,998 A | 7/1997 | Bertschi et al. | 425/127 |
| 5,705,202 A | 1/1998 | Gellert | 425/549 |
| 5,795,600 A | 8/1998 | Rozema | 425/562 |
| 5,830,524 A | 11/1998 | Braun | 425/549 |
| 5,843,361 A | 12/1998 | Gellert | 264/297.2 |
| 5,894,023 A | 4/1999 | Schram et al. | 425/130 |
| 5,914,138 A | 6/1999 | Swenson | 425/130 |
| 5,935,614 A | 8/1999 | Blank et al. | 425/130 |
| 6,287,107 B1 * | 9/2001 | Kazmer | 425/562 |

FOREIGN PATENT DOCUMENTS

| | | | | |
|---|---|---|---|---|
| EP | 0 799 683 A2 | 10/1997 | | B29C/45/16 |
| EP | 0 839 629 A1 | 8/1998 | | B29C/45/16 |
| EP | 0 901 896 A2 | 8/1998 | | B29C/45/16 |
| EP | 0 873 840 A1 | 10/1998 | | B29C/45/04 |
| EP | 0 894 604 A1 | 2/1999 | | B29C/45/16 |
| FR | 2 512 389 | 9/1981 | | B29F/1/06 |
| JP | 61230911 | 10/1986 | | B29B/11/08 |
| JP | 02022022 | 1/1990 | | B29C/45/16 |
| JP | 03024928 | 2/1991 | | B29C/45/16 |
| JP | 06226784 | 8/1994 | | B29C/45/16 |
| WO | WO 98/13187 | 4/1998 | | B29C/45/16 |
| WO | WO 99/54109 | * 10/1999 | | |

* cited by examiner

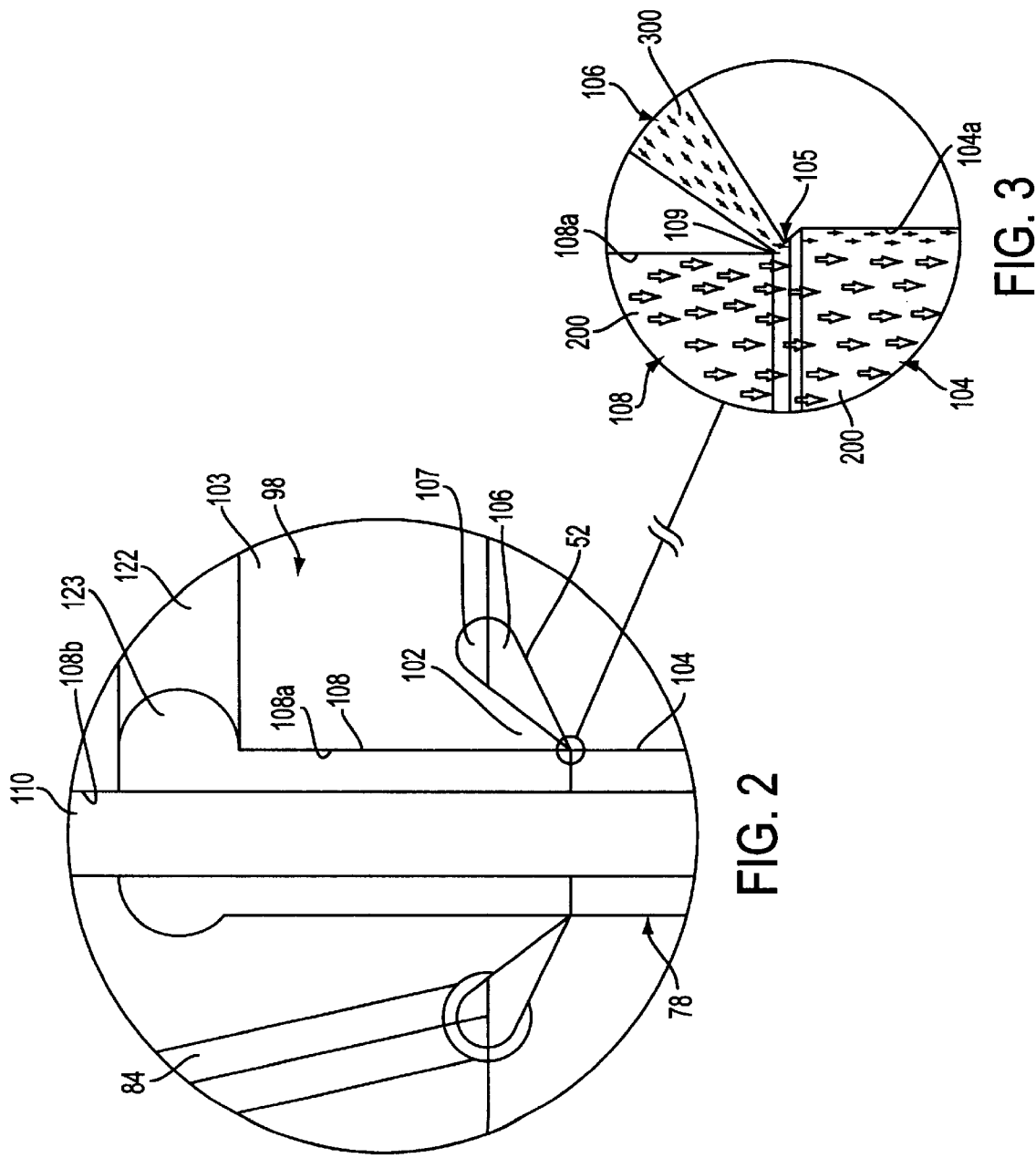

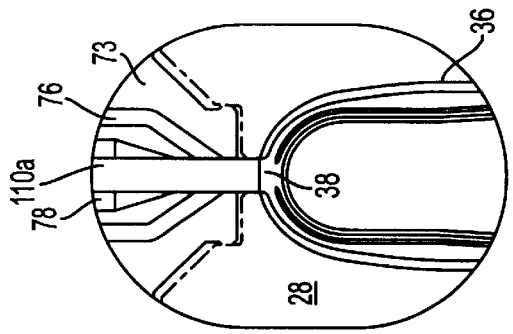
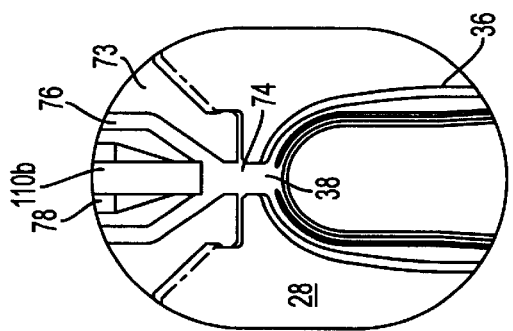
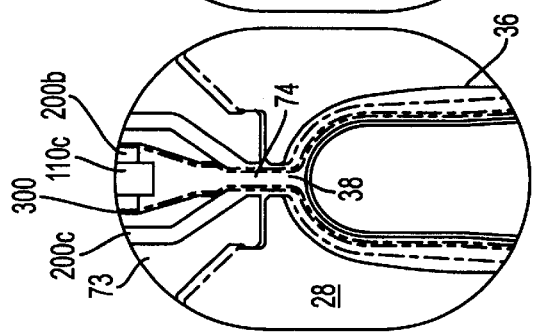
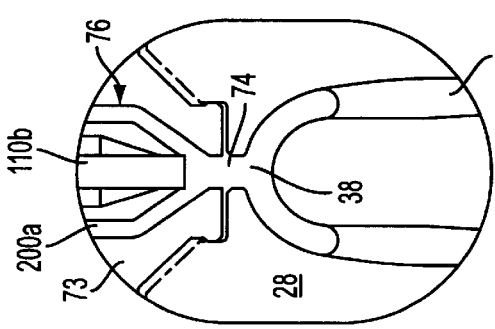
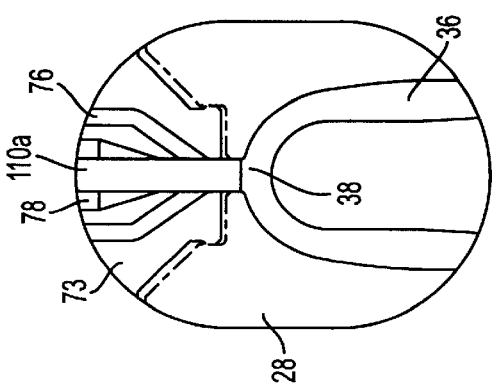

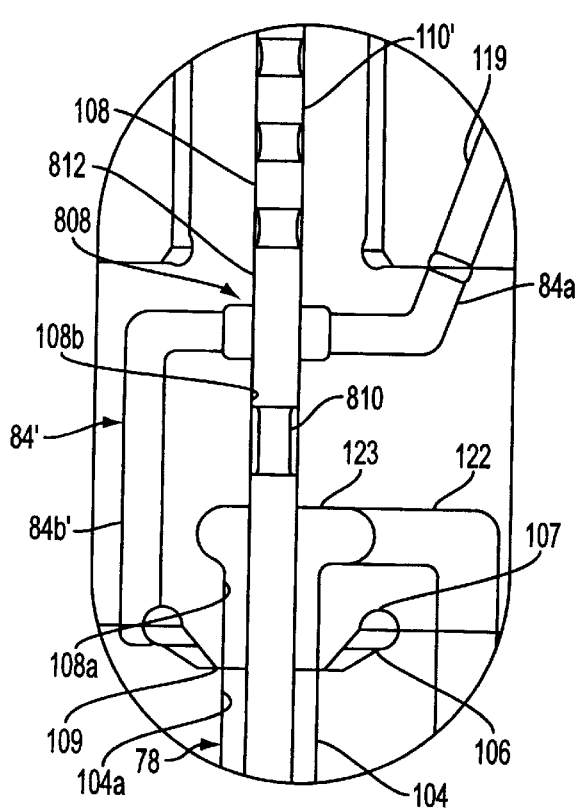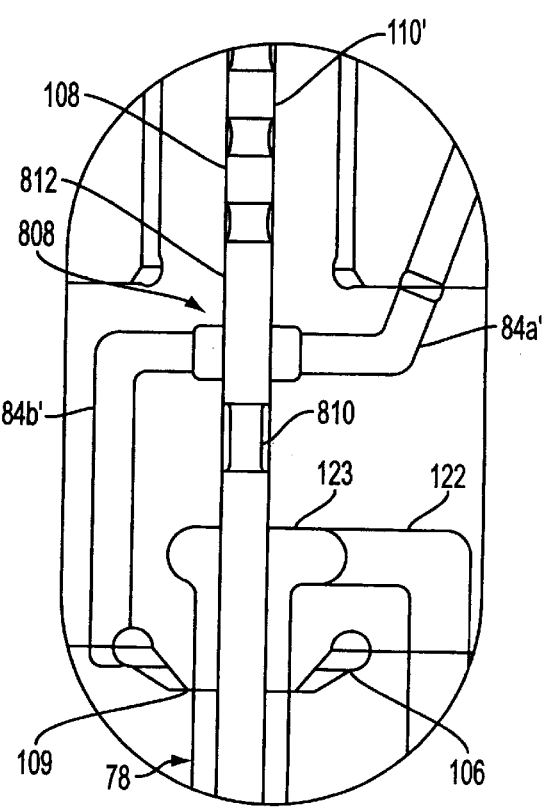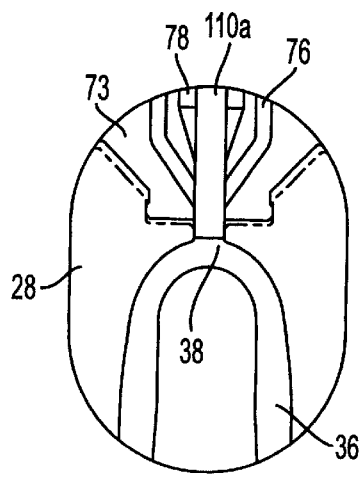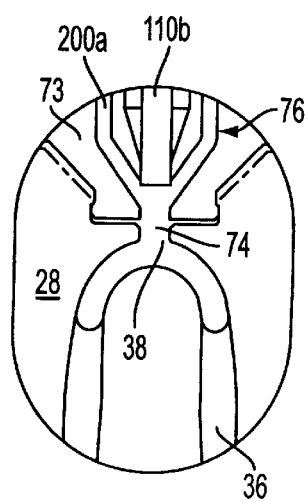
FIG. 11A   FIG. 11B
FIG. 11A'   FIG. 11B'

APPARATUS AND METHOD FOR MULTI-LAYER INJECTION MOLDING

CROSS-REFERENCE TO RELATED APPLICATIONS

This application is a continuation-in-part of U.S. patent application Ser. No. 09/271,835, filed on Mar. 18, 1999, and U.S. patent application Ser. No. 09/274,443, filed on Mar. 22, 1999, both of which are specifically incorporated in their entirety herein by reference.

FIELD OF INVENTION

The present invention relates to multi-layer products, and an apparatus and method for the injection molding of same. More specifically, it relates to a back-flow control valve for an injection molding apparatus.

BACKGROUND OF THE INVENTION

Multi-cavity injection molding apparatus for making multi-layer molded products, such as protective containers for food, preforms for beverage bottles, and closures, are well-known. One or more layers of one material are typically molded within, or together with, one or more layers of another material, to form the molded product. At least one of these layers is usually a barrier layer formed from a barrier material to protect the contents of the molded product. Since the barrier material is expensive, typically only a very thin barrier layer is used in the molded product. It is also generally desirable to have this thin barrier layer uniformly and evenly distributed (i.e., well-balanced) throughout the molded product to provide the proper protection for the contents of the molded product.

One common method for injection molding of products is sequential injection molding. In sequential injection molding, one or more materials are injected into a cavity in a specified order or sequence. For instance, a preform or closure material may be injected into a cavity first, followed by the injection of a barrier material into the cavity second. Sequential injection molding may be used alone to form molded products, or may be combined with coinjection or simultaneous injection molding.

Problems can occur in sequential injection molding, however, when one material back-flows into the melt passage of another material. Such mixing of the two materials outside of the cavity can cause problems with the flow of materials through the injection molding apparatus, and often results in an undesirable or low quality molded product. For example, if a preform or closure material that is being injected into a cavity back-flows into a melt passage carrying a barrier material, it may be difficult for the barrier material to flow through the injection molding apparatus during its injection cycle into the cavity. Moreover, the resulting molded products may not have the proper or intended composition of materials, since the injection of the barrier material into the cavity will also include the preform or closure material that has back-flowed into the melt passage of the barrier material.

Accordingly, it would be desirable to have an apparatus and method for injection molding that overcomes the problems associated with the prior art by having a control for the back-flow of one material into the melt passage of another material. An apparatus and method for injection molding that restricts or substantially prevents the back-flow of one material into the melt passage of another material would not only produce a more efficient injection molding apparatus and method, but would also result in a higher quality molded product.

SUMMARY OF THE INVENTION

The present invention provides an injection molding apparatus comprising a first melt passage for the flow of a first material, and a second melt passage in communication with the first melt passage for the flow of a second material. The injection molding apparatus of the present invention also comprises a valve pin that passes through the second melt passage. The valve pin has a first portion allowing the flow of the second material through the second melt passage, and a second portion restricting the flow of the first material and the second material through the second melt passage.

In addition, the present invention provides a back-flow control valve in combination with a melt passage of an injection molding apparatus. The back-flow control valve comprises a first portion for permitting flow of material through the melt passage, and a second portion for restricting flow of material through the melt passage.

The present invention also provides an injection molding apparatus comprising a manifold having at least a portion of a melt passage, and a nozzle having a melt channel in communication with the melt passage. The injection molding apparatus further comprises a cavity aligned with the melt channel of the nozzle. Also, the injection molding apparatus comprises a valve member having a first portion for restricting flow of material through the melt passage, and a second portion for restricting flow of material from the melt channel into the cavity.

Moreover, the present invention also provides a method for injection molding comprising the step of injecting a material into a melt passage having a first section and a second section. The method of the present invention further comprises the step of positioning a first portion of a valve pin between the first and second sections to permit flow of the material through the melt passage. The method of the present invention also comprises the step of positioning a second portion of the valve pin between the first and second sections to restrict flow of the material through the melt passage.

BRIEF DESCRIPTION OF THE DRAWINGS

FIG. 2 is an exploded cross-sectional view of a portion of a valve bushing of the a injection molding apparatus of FIG. 1.

FIG. 3 is an exploded cross-sectional view of the portion of the valve bushing of FIG. 2.

FIGS. 4A–4E are exploded cross-sectional views of a nozzle and a cavity of the apparatus of FIG. 1, illustrating a method of the present invention.

FIGS. 11A–D are exploded cross-sectional views of a portion of a valve bushing of the injection molding apparatus of FIG. 10, illustrating a method of the present invention.

FIGS. 11A'–D' are identical to FIGS. 4A–D, respectively.

DETAILED DESCRIPTION OF PREFERRED EMBODIMENTS

Figure 1:
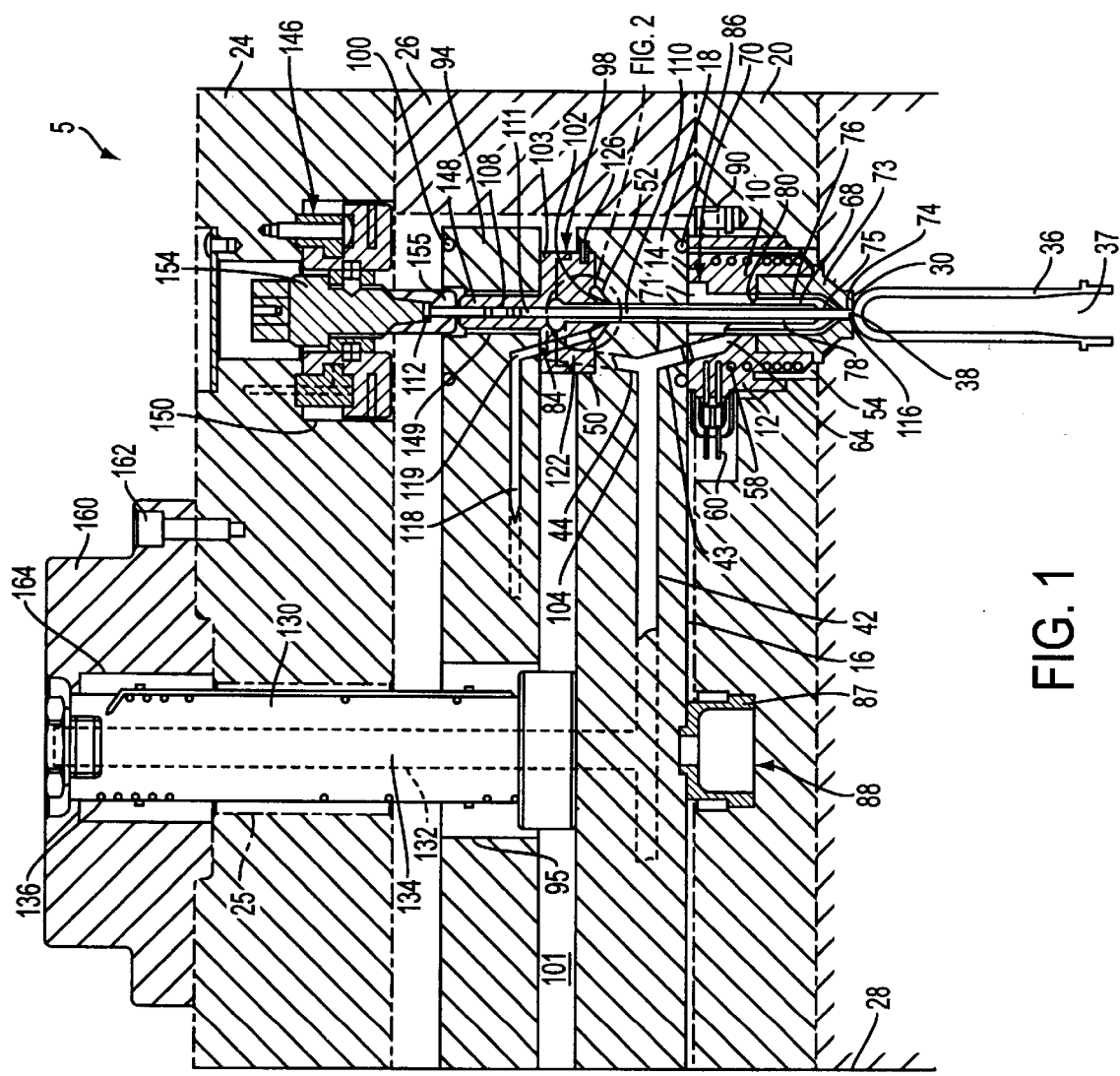
FIG. 1 is a cross-sectional view of a valve-gated injection molding apparatus of the present invention for a three layer bottle preform.

Turning now to the drawings, FIG. 1 shows a preferred embodiment of a portion of a valve-gated, multi-cavity injection molding apparatus 5 of the present invention with one nozzle 10 for molding three layer bottle preforms, closures, or other products by sequential and simultaneous coinjection. Although only one nozzle is shown in FIG. 1 for ease of illustration, any desirable number of nozzles (i.e., 12, 16, or 48) may be used with the apparatus of the present invention. Preferably, each additional nozzle would have identical features to the nozzle 10 shown in FIG. 1 and described in detail below.

Besides the nozzle 10, the apparatus 5 also comprises a front melt distribution manifold 18, a nozzle retainer plate 20, a back plate 24, a cavity retainer plate 28, and a rear melt distribution manifold 94. Preferably, the nozzle retainer plate 20 and the back plate 24 are joined together with a manifold plate 26. It should also be understood that the apparatus 5 can have a greater or fewer number of plates depending upon the application, and for ease of illustration, only the above-identified plates are shown in FIG. 1.

The nozzle retainer plate 20 is located about an end 87 of a manifold locator 88 between the front melt distribution manifold 18 and the cavity retainer plate 28. The nozzle retainer plate 20 has a nozzle seat opening 54 for receiving the nozzle 10. Preferably, there is a separate nozzle seat opening for every nozzle of the injection molding apparatus. The nozzle retainer plate 20 also preferably has an anti-rotational cam 90 next to the nozzle 10 to prevent the nozzle from rotating within its respective nozzle seat opening 54.

The nozzle 10 has a body 12 with a front tip end 30 and a rear end 14. The nozzle is heated by an integral electrical heating element 58 wrapped around the body 12. The heating element 58 has a terminal 60 positioned near the rear end of the nozzle. The nozzle 10 also has a radial melt channel 64 extending from the rear end 14. In addition, the nozzle 10 has a nozzle gate seal 73 that is secured within the body 12 of the nozzle 10 and forms the front tip end 30. Also, the nozzles gate seal 73 has a front opening 74 to allow material to pass out through the front tip end 30 of the nozzle 10.

The nozzle also has a liner sleeve 70 secured within the nozzle gate seal 73. The liner sleeve 70 has a front opening 75 aligned with and near the front opening 74 of the nozzle gate seal 73, and a rear end 71 corresponding to the rear end 14 of the nozzle 10. Together the liner sleeve 70 and the nozzle seal 73 form an annular melt channel 76 between them that extends throughout the nozzle gate seal 73, and is in fluid communication with the radial melt channel 64. Preferably, the liner sleeve 70 also has an angled flange 80 near the nozzle gate seal 73 to direct the flow of material from the radial melt channel 64 into the annular melt channel 76.

In addition, the liner sleeve 70 has a central bore 68 that extends throughout the body 12 and to the rear end 14 of the nozzle 10. The central bore 68 of the liner sleeve 70 is designed to receive an elongated valve pin 110. It should be understood, however, that the valve pin 110 may readily be replaced with another suitable valve member, such as a valve stem or valve sleeve. The central bore 68 also defines a portion of a central melt channel 78 for the flow of material around the valve pin 110 and through the nozzle 10. As shown in FIG. 1, the annular melt channel 76 is radially spaced from the central melt channel 78.

The valve pin 110 has a body 111, a head 112, and a front tip 116 opposite the head 112. The front tip 116 may be either squared off, as shown in FIGS. 1, 4A–4E, and 5, or tapered (not shown). The front tip 116 is also designed to fit within the front opening 74 of the nozzle gate seal 73. In addition, the valve pin 110 is capable of being moved forward and backward to several different positions, as described in more detail below.

The front melt distribution manifold 18 is positioned on the manifold locator 88 between the nozzle retainer plate 20 and the rear melt distribution manifold 94. The front melt distribution manifold 18 is heated by an integral electrical heating element 86 and has a front face 16 that abuts against the rear end 14 of the nozzle 10. The front melt distribution manifold 18 also has at least one bushing seat opening 50 with a recessed portion 52 for receiving a valve bushing 98, and at least one melt bore 104, with a diameter 104a, in communication with the central bore 68 of the liner sleeve 70. Like the central bore 68, the melt bore 104 is designed to receive the valve pin 110, and defines another portion of the central melt channel 78 for the flow of material around the valve pin 110 and through the front melt distribution manifold 18. Preferably, the front melt distribution manifold 18 has a bushing seat opening 50 and a melt bore 104 for each nozzle 10 used in the apparatus 5.

In addition, the front melt distribution manifold 18 has a first melt passage 42 with a first melt portion 43 extending forward through the front melt distribution manifold 18 and in communication with the radial melt channel 64 of the nozzle 10. The first melt portion 43 allows material to flow from the first melt passage 42 into the radial melt channel 64 and then into the annular melt channel 76 of the nozzle 10. Accordingly, the first melt portion 43, and thus the first melt passage 42, is in communication with the annular melt channel 76 through the radial melt channel 64.

The front melt distribution manifold 18 also has a second melt portion 44 extending backward through the front melt distribution manifold 18 and in communication with the bushing seat opening 50. The second melt portion 44 allows material to flow from the first melt passage 42 backward into the valve bushing 98 seated in the bushing seat opening 50, as explained in more detail below.

As shown in FIG. 1, a melt inlet nozzle 130 abuts against the front melt distribution manifold 18 opposite the nozzle retainer plate 20. The melt inlet nozzle 130 has a central bore 132 partially defining a main melt passage 134 that extends throughout the melt inlet nozzle 130 and into the front melt distribution manifold 18. The main melt passage is in fluid communication with the first melt passage 42 of the front melt distribution manifold 18 and an injection cylinder (not shown) for supplying a preform material 200, such as polyethylene terephthalate ("PET"). The melt inlet nozzle 130 also has a heating element 136.

The apparatus 5 also comprises a rear melt distribution manifold 94 positioned on the manifold locator 88 between, but preferably spaced apart from, the front melt distribution manifold 18 and the back plate 24, as shown in FIG. 1. The rear melt distribution manifold has a central bore 95 for receiving the melt inlet nozzle 130. The rear melt distribution manifold 94 also has a second melt passage 118 in communication with an injection cylinder (not shown) for supplying a barrier material 300, such as nylon or ethylene vinyl alcohol ("EVOH"). The second melt passage 118 also has an L-shaped portion 119 extending forward out the rear melt distribution manifold 94. In addition, the rear melt distribution manifold 94 has a bushing bore 149 aligned with the melt bore 104 of the front melt distribution manifold 18. As described in more detail below, the rear melt distribution manifold 94 is heated by an integral electrical heating element 100 to a lower operating temperature than the front melt distribution manifold 18, and the air space 101 provided between the two manifolds 18, 94 provides thermal separation between them.

The apparatus 5 of the present invention also includes a valve bushing 98 positioned between the manifolds 18, 94, and seated within the bushing seat opening 50 of the first melt distribution manifold 18. In order to facilitate its manufacture, the valve bushing 98 is preferably made of a plurality of components that are brazed together to form a single integral component. As shown in FIG. 1, the valve bushing 98 has a tip protrusion 102 extending forwardly from a middle head portion 103 into the recessed portion 52 of the front melt distribution manifold 18. Together, the tip protrusion 102 and the recessed portion 52 form an annular ring channel 106 between them, as shown in FIG. 2. The annular ring channel 106 surrounds the central melt channel 78. The valve bushing 98 also has an elongated rear stem portion 148 extending rearwardly from the middle head portion 103 through the bushing bore 149 in the rear melt distribution manifold 94. A dowel pin 126 located between the middle head portion 103 and the front melt distribution manifold 18 accurately retains the valve bushing 98 in place and prevents it from rotating.

The valve bushing 98 also has a central bore 108, which extends through the tip protrusion 102, the middle head portion 103, and the stem portion 148. As shown in FIG. 2, similar to the central bore 68 and the melt bore 104, the central bore 108 has a first diameter 108a for receiving the valve pin 110, and defining the a portion of the central melt channel 78 for the flow of material around the valve pin 110 and through the valve bushing 98. The first diameter 108a of the central bore 108 is preferably smaller, however, than the diameter 104 of the melt bore 104. The central bore 108 also has a second diameter 108b for receiving just the valve pin 10, and for preventing the flow of material rearwardly through the valve bushing 98.

As shown in FIG. 3, the central bore 108 of the valve bushing 98 and the melt bore 104 of the front melt distribution manifold 18 are joined together with a flow extension 105, which also forms a portion of the central melt channel 78. The flow extension 105 has an annular flow opening 109 in communication with the annular ring channel 106. Preferably, the annular flow opening 109 is sized to be substantially equal to the difference between the diameters 104a, 108a of the melt bore 104 and the central bore 108, respectively. In other words, the width of the central melt channel 78 is preferably increased to accommodate the additional material flow from the annular ring channel 106, without interrupting or affecting the flow of other material in the central melt channel. It should also be understood that the amount of material flowing from the annular ring channel 106 may be controlled by increasing (i.e., more flow) or decreasing (i.e., less flow) the size of the annular flow opening 109.

As shown in FIGS. 1–2, the valve bushing 98 has an L-shaped first transitional melt passage 122 and a second transitional melt passage 84. The first transitional melt passage 122 is aligned and in communication with both the second melt portion 44 of the front melt distribution manifold 18 and an annular passage 123 in the middle head portion 103 of the valve bushing 98. The annular passage 123 is also in communication with the central bore 108 of the valve bushing 98, as best shown in FIG. 2. Accordingly, the second melt portion 44, and thus the first melt passage 42, is in communication with the central melt channel 78 through the first transitional melt passage 122 and the annular passage 123.

The second transitional melt passage 84 is in communication with both the L-shaped portion 119 of the second melt passage 118 and an annular ring groove 107 disposed around the tip protrusion 102 of the valve bushing 98. The annular ring groove 107 is also in communication with the annular ring channel 106, as best shown in FIG. 2. Accordingly, the L-shaped portion 119, and thus the second melt passage 118, is in communication with the annular ring channel 106 through the second transitional melt passage 84 and the annular ring groove 107.

The back plate 24 of the apparatus 5 of the present invention is positioned on the manifold locator 88 next to the rear melt distribution manifold 94 opposite the front melt distribution manifold 18. The back plate 24 has a central bore 25 aligned with the central bore 95 of the rear melt distribution manifold 94 for receiving the melt inlet nozzle 130. In addition, a locating ring 160 is preferably attached with one or more bolts 162 to the back plate 24 opposite the rear melt distribution manifold 94. The locating ring 160 also has a central bore 164 aligned with the central bore 25 of the back plate 24 for receiving the melt inlet nozzle 130.

The back plate 24 preferably has a piston seat opening 150 aligned with the bushing bore 149 of the rear melt distribution manifold 94. An actuating mechanism 146 is positioned within the piston seat opening 150. The actuating mechanism 146 comprises a piston cylinder 154 and an end cap 155 for connecting the head 112 of the valve pin 110 to the piston cylinder 154. During operation of the actuating mechanism 146, the piston cylinder 154 and the end cap 155 may extend into a portion of the bushing bore 149, as shown in FIG. 1. The piston cylinder 154 is preferably driven by controlled fluid pressure (i.e., from oil or water) applied through one or more ducts (not shown). It should be understood that while only a hydraulic actuating mechanism is described and shown herein, other types of actuating mechanisms, such as electro-mechanical mechanisms, can be used with the apparatus of the present invention.

Driving the piston cylinder 154 forward causes the valve pin 110 to move forward toward the cavity retainer plate 28. Moving the piston cylinder 154 all the way forward causes the front tip end 116 of the valve pin 110 to be seated within the front opening 74 of the nozzle gate seal 73, thereby cutting off fluid communication between the melt channels 76, 78 and the front opening 74 of the nozzle gate seal 73. On the other hand, driving the piston cylinder 154 backward causes the valve pin 110 to move backward away from the cavity retainer plate 28. Moving the piston cylinder 154 backward past the front opening 74 of the nozzle gate seal 73 causes the front tip end 116 of the valve pin 110 to be withdrawn from the front opening 74 of the nozzle gate seal 73, thereby establishing fluid communication between the annular melt channel 76 and the front opening 74 of the nozzle gate seal 73. In addition, moving the piston cylinder 154 backward past the front opening 75 of the liner sleeve 70 causes the front tip end 116 of the valve pin 110 move backward past the front opening 75 of the liner sleeve 70, thereby establishing fluid communication between not only the annular melt channel 76 and the front opening 74 of the nozzle gate seal 73, but also between the central melt channel 78 and the front opening 74 of the nozzle gate seal 73.

Figure 5:
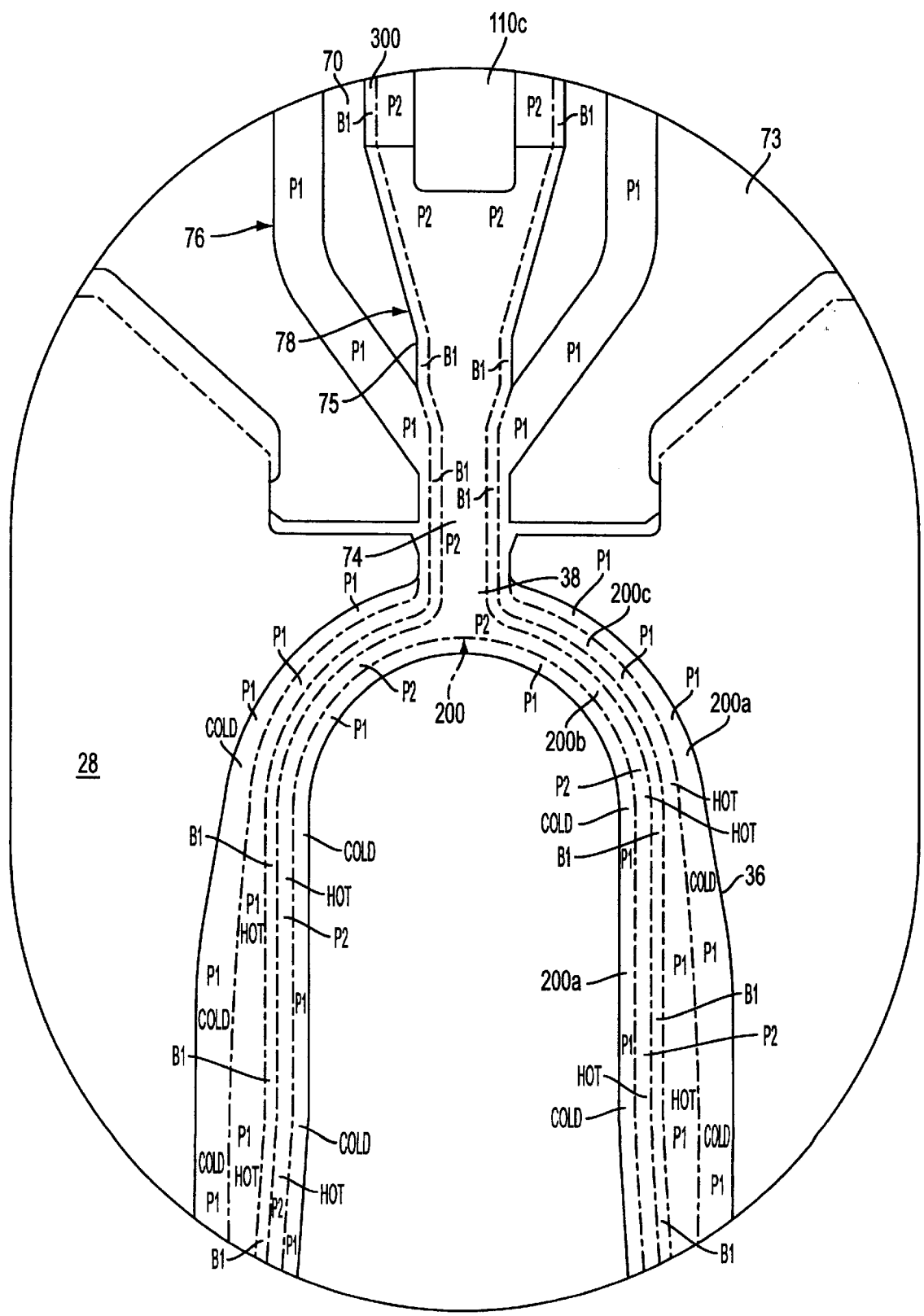
FIG. 5 is an exploded cross-sectional view of FIG. 4C.

As shown in FIGS. 1 and 5, the cavity retainer plate 28 of the present invention has a cavity 36 around a mold core 37. The cavity 36 has a cavity opening 38 aligned with the front opening 74 of the nozzle gate seal 73. The cavity 36 may have any number of shapes and configurations depending on the desired product to be molded. As shown in FIG. 1, the cavity preferably, but not necessarily, has the shape of a bottle preform with a threaded end. It should be understood that by altering the cavity 36, one may mold other bottle preforms of different shapes and configurations, or products different from bottle preforms, such as closures, and the present invention is not limited to the molding of only the bottle preform shown or even other types of preforms.

It should also be understood that the apparatus 5 of the present invention, especially its nozzles, may also have one or more heating systems, cooling systems, and insulative air spaces to maintain the proper temperatures for its components and the materials flowing through the apparatus. Examples of suitable heating systems, cooling systems, and insulative air spaces for the apparatus of the present invention are described in U.S. patent application Ser. No. 08/969,764, entitled "Sprue Gated Five Layer Injection Molding Apparatus," filed on Nov. 13, 1997, as well as U.S. Pat. Nos. 5,094,603,5,135,377, and 5,223,275 to Gellert, which are all specifically incorporated in their entirety herein by reference.

The operation of the apparatus of the present invention will now be described with particular reference to FIGS. 4A–4E and 5. While the formation of only a three layer bottle preform is shown in the drawings and described below, it should be understood that other types of three layer preforms or products different than preforms, such as closures, with different material characteristics, may be the resulting products of the apparatus and method of the present invention.

As shown in FIG. 4A, the method of the present invention begins with the valve pin fully inserted through the front opening 74 of the nozzle gate seal 73 by the forward motion of the piston cylinder 154. As a result, fluid communication between the annular melt channel 76, the central melt channel 78, and the front opening 74 of the nozzle gate seal 73 is cutoff. In this position, the valve pin is identified by the reference numeral 110a. Electrical power is then applied to the heating elements 58, 86, 136 of the nozzle 10, the front melt distribution manifold 18, and the melt inlet nozzle 130, respectively, to heat them to an operating temperature for the preform material disposed within the main melt passage 134 and the first melt passage 42. If PET is used for the preform material, the preferred operating temperature is about 565° F.

Next, the valve pin is pulled out of the front opening of the nozzle gate seal by the backward motion of the piston cylinder, as shown in FIG. 4B. As a result, fluid communication is established between the annular melt channel and the front opening of the nozzle gate seal, but not between the central melt channel and the front opening of the nozzle gate seal. In this position, the valve pin is identified by the reference numeral 110b.

Injection pressure is then applied to the main melt passage 134 to force a first portion 200a of preform material through the first melt passage 42 and into the first melt portion 43. From there, the first portion 200a of preform material flows through the radial melt channel 64 aligned with the first melt portion 43, into the annular melt channel 76, out the front opening 74 of the nozzle gate seal 73, and into the cavity opening 38. Injection pressure is applied until the first portion 200a of preform material fills the cavity 36, as shown in FIG. 4B. The first portion 200a of preform material begins to cool as it fills the cavity 36.

Electrical power is then applied to the heating element 100 in the rear melt distribution manifold 94 to heat it to an operating temperature for the barrier material 300 disposed within the second melt passage 118. If nylon is used for the barrier material, the preferred operating temperature is about 400° F. Next, the valve pin is pulled out of the front opening 75 of the liner sleeve 70 by the backward motion of the piston cylinder, as shown in FIG. 4C. As a result, fluid communication is established between not only the annular melt channel and the front opening of the nozzle gate seal, but also between the central melt channel and the front opening of the nozzle gate seal. In this position, the valve pin is identified by the reference numeral 110c.

Injection pressure is then applied to the main melt passage 134 to force a second portion 200b of preform material through the first melt passage 42 and into the second melt portion 44, and a third portion 200c of preform material through the first melt passage 42 and into the first melt portion 43. From there, the second portion 200b of preform material flows through the L-shaped first transitional melt passage 122 aligned with the second melt portion 44 and into the annular passage 123 of the valve bushing 98, and the third portion 200c of preform material flows through the radial melt channel 64 aligned with the first melt portion 43 and into the annular melt channel 76. The second portion 200b of preform material also flows from the annular passage 123 into the central melt channel 78 and around the valve pin 110 toward the cavity 36.

At about the same time, injection pressure is applied to the barrier material 300 in the second melt passage 118 to force the barrier material through the second melt passage 118 and into its L-shaped portion 119. From there, the barrier material 300 flows into the second transitional melt passage 84, through the annular ring groove 107, and into the annular ring channel 106. As best shown in FIG. 3, the barrier material 300 flows from the annular ring channel 106, through the flow opening 109, and into the flow extension 105. The barrier material 300 then joins and surrounds the flow of the second portion 200b of the preform material in the central melt channel 78. Since the flow opening 109 is preferably sized to be substantially equal to the difference between the diameters 104a, 108a of the melt bore 104 of the front melt distribution manifold 18 and the central bore 108 of the valve bushing 98, respectively, the flow of the barrier material does not interrupt the flow of the second portion of the preform material. As a result, the flow pressure of the second portion of the preform material before the flow extension is substantially the same as the flow pressure of the second portion of the preform material after the flow extension. In addition, since the barrier material flows together with the second portion 200b of the preform material through the central melt channel 78, as best shown in FIG. 5, degradation and pressure drop problems causes by too large or too small of channels for the barrier material are avoided.

Together, the barrier material 300 and the second portion 200b of the preform material flow through the central melt channel 78 and around the valve pin 110, and out the front opening 75 of the liner sleeve 70. Here, the barrier material 300 and the second portion 200b of the preform material are joined and surrounded by the third portion 200c of the preform material flowing from the annular melt channel 76. At this point, the third portion 200c of the preform material, the barrier material 300, and the second portion 200b of the preform material are all still hot. Together, the third portion 200c of the preform material, the barrier material 300, and the second portion 200b of the preform material simultaneously flow out the front opening 74 of the nozzle gate seal 73, and into the cavity opening 38. The simultaneous flow of these materials helps reduce the cycle or production time for the resulting perform. Next, the third portion 200c of the hot preform material, the hot barrier material 300, and the second portion 200b of the hot preform material split the first portion 200a of the cooled preform material in the cavity 36, as shown in FIGS. 4C and 5. Injection pressure is applied to the first and second melt passages 42, 118 until the cavity 36 is completely filled with material.

As best shown in FIG. 5, the barrier material 300 is surrounded by, and embedded within, the second and third portions 200b, 200c of hot preform material as the barrier material 300 flows into the cavity 36. As a result, the second and third portions 200b, 200c of hot preform material insulate the barrier material 300 from the first portion 200a of cooled preform material already in the cavity 36. This arrangement provides an evenly and uniformly distributed layer of barrier material within the resulting preform.

In addition, since the barrier material 300 is surrounded by the second and third portions 200b, 200c of the hot preform material, the distribution and position of the barrier material 300 within the cavity is properly controlled. In other words, the distribution and positioning of the barrier material 300 is not solely dependent on the cavity, the mold core, and/or the cooled preform material already present in the cavity. Instead, the distribution and positioning of the barrier material for the cavity, and thus the resulting preform, is controlled and balanced by the melt channels before the barrier material enters the cavity 36. The position of the barrier material within the cavity, and thus the resulting preform, may also be set and controlled by manipulating the timing, temperature, and pressure as known in the art. This arrangement ensures that the barrier material will be correctly positioned and balanced within the cavity, and avoids the unbalanced distribution and positioning of the barrier material within the cavity that can be caused, for example, by misalignment or shifting of the mold core 37.

After the cavity 36 is filled, the valve pin is moved forward by the piston cylinder to cutoff material flow and fluid communication between the central melt channel and the front opening of the liner sleeve, as shown in FIG. 4D. As shown in FIG. 4E, the piston cylinder continues to move the valve pin forward until the valve pin is fully inserted into the front opening of the nozzle gate seal, thereby also cutting off material flow and fluid communication between the annular melt channel and the front opening of the nozzle gate seal. Since the valve pin shuts off the flow of material out of the nozzle, it is not necessary to release the injection pressure applied to the preform or barrier material. Once the cavity is filled and the material flow has stopped, the preform continues to cool until the material has solidified enough to be ejected from the cavity.

Figure 6:
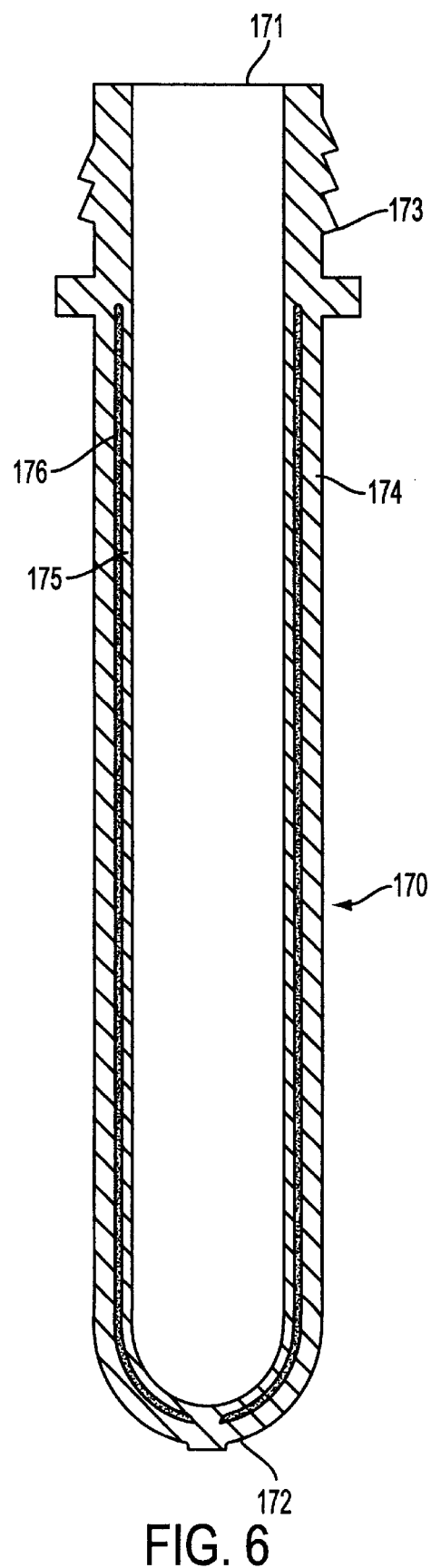
FIG. 6 is a cross-sectional view of a three layer bottle preform of the present invention.

As a result of the apparatus and method of the present invention, a bottle preform 170 may be created, as shown in FIG. 6. The bottle preform 170 has a first open end 171 and a second closed end 172 spaced from and opposite of the first open end. Preferably, but not necessarily, the first open end 171 has threads 173. The bottle preform 170 also has an outer layer 174 of preform material, such as PET, an inner layer 175 of preform material, such as PET, and a core layer 176 of barrier material, such as nylon or EVOH, between the outer and inner layers 174, 175 of preform material. The core layer 176 of barrier material preferably extends substantially throughout the bottle preform 170, as shown in FIG. 6. Each layer 174, 175, 176 has several properties, including, but not limited to, thickness, weight, and percentage of total volume ("volume percentage").

By altering the timing and/or the amount of preform or barrier material, the properties of the outer, inner, and core layers 174, 175, 176 may also be altered. For instance, by injecting a larger amount of the first, second, and/or third portions 200a, 200b, 200c of the preform material into the cavity 36, thicker and heavier outer and/or inner layers 174, 175 of preform material may be formed. Assuming a constant total volume for the cavity, and thus the bottle preform 170, the volume percentage of the preform material will be increased, while the volume percentage of the barrier material 300 will be decreased. On the other hand, by injecting a larger amount of barrier material into the cavity, a thicker and heavier core layer 176 of barrier material may be formed. Assuming once again a constant total volume for the cavity, and thus the bottle preform, the volume percentage of the barrier material will be increased, while the volume percentage of the preform material will be decreased.

Figure 7:
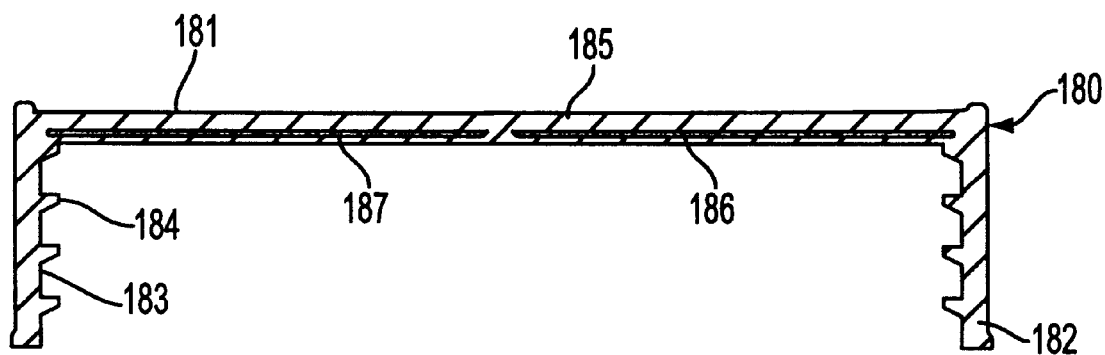
FIG. 7 is a cross-sectional view of a three layer closure of the present invention.

As a result of the apparatus and method of the present invention, a closure 180 may also be created, as shown in FIG. 7. The closure 180 may be made with the same apparatus and method as the bottle perform 170, with the exception that the preform material (i.e., PET) is preferably replaced with a closure material, such as polypropylene. The closure 180 has a base 181 and an annular flange 182 extending outward from the base. The annular flange 182 has an inner side 183, preferably, but not necessarily, with threads 184. The closure 180 also has an outer layer 185 of closure material, such as polypropylene, an inner layer 186 of closure material, such as polypropylene, and a core layer 187 of barrier material, such as nylon or EVOH, between the outer and inner layers 185, 186 of closure material. The core layer 187 of barrier material preferably extends substantially throughout the base 181 of the closure 180, as shown in FIG. 7. Each layer 185, 186, 187 has several properties, including, but not limited to, thickness, weight, and percentage of total volume ("volume percentage").

By altering the timing and/or the amount of closure or barrier material, the properties of the outer, inner, and core layers 185, 186, 187 may also be altered. For instance, by injecting a larger amount of the first, second, and/or third portions of the closure material into the cavity, thicker and heavier outer and/or inner layers 185, 186 of closure material may be formed. Assuming a constant total volume for the cavity, and thus the closure 180, the volume percentage of the closure material will be increased, while the volume percentage of the barrier material will be decreased. On the other hand, by injecting a larger amount of barrier material into the cavity, a thicker and heavier core layer 187 of barrier material may be formed. Assuming once again a constant total volume for the cavity, and thus the closure, the volume percentage of the barrier material will be increased, while the volume percentage of the closure material will be decreased.

Figure 8:
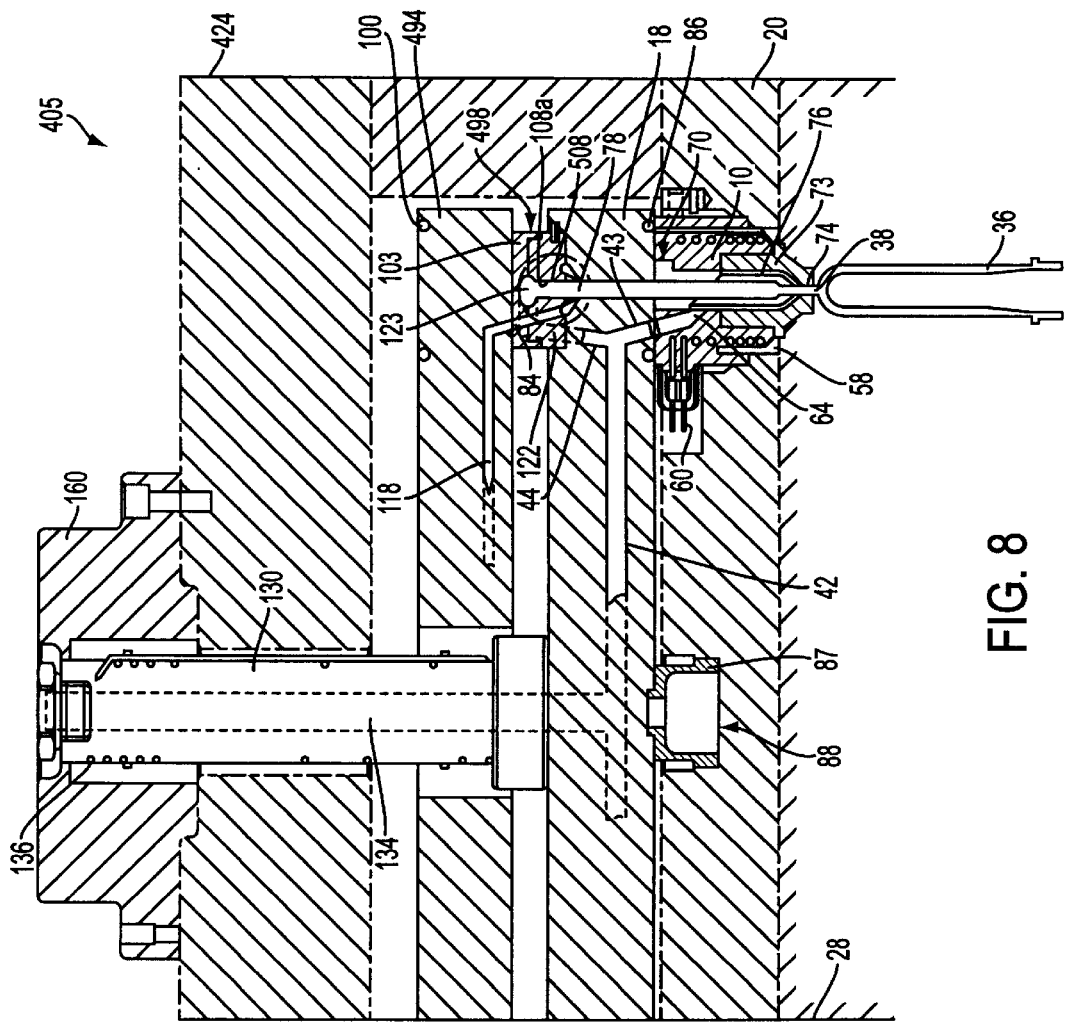
FIG. 8 is a cross-sectional view of a thermal-gated injection molding apparatus of the present invention for a three layer bottle preform.

As an alternative to the valve-gated apparatus 5 shown in FIGS. 1–5 and described above, FIG. 8 shows a preferred embodiment of a portion of a thermal-gated, multi-cavity injection molding apparatus 405 of the present invention.

The apparatus 405 is identical to, and operates in the same manner as, the apparatus 5, with only a few exceptions. To avoid redundancy and unnecessary repetition, only the differences between the apparatus 405 and the apparatus 5 will be discussed in detail below. Similarly, for ease of illustration, only some of the components of the apparatus 405 are identified by reference numerals in FIG. 8. Preferably, the non-identified components of the apparatus 405 are identical to the corresponding components of the apparatus 5. In addition, it should be understood that, like the apparatus 5, the apparatus 405 may be used to create both the bottle preform 170 and the closure 180 shown in FIGS. 6–7 and described above.

The primary difference between the apparatus 405 and the apparatus 5 is that the apparatus 405 does not have a valve pin. As a result, the apparatus 405 is manipulated by controlling the injection pressure applied to the first and second melt passages, rather than by controlling the valve pin. In other words, instead of moving a valve pin forward and backward to cutoff and establish the flow of material, the apparatus 405 uses increases and decreases in the injection pressure to cutoff or establish the flow of material. Otherwise, the operation and method of the apparatus 405 is the same as the operation and method of the apparatus 5.

Since the apparatus 405 does not use a valve pin, certain components of the apparatus 5 are no longer necessary for the apparatus 405. For instance, the back plate 424 of the apparatus 405 does not have a piston seat opening 150 or an actuating mechanism 146. Likewise, the rear melt distribution manifold 494 of the apparatus 405 does not have a bushing bore 149. Moreover, the valve bushing 498 of the apparatus 405 does not have a stem portion 148, and the valve bushing 498 has a central bore 508, with only one diameter 108a, that does not extend past the annular passage 123.

Figure 9:
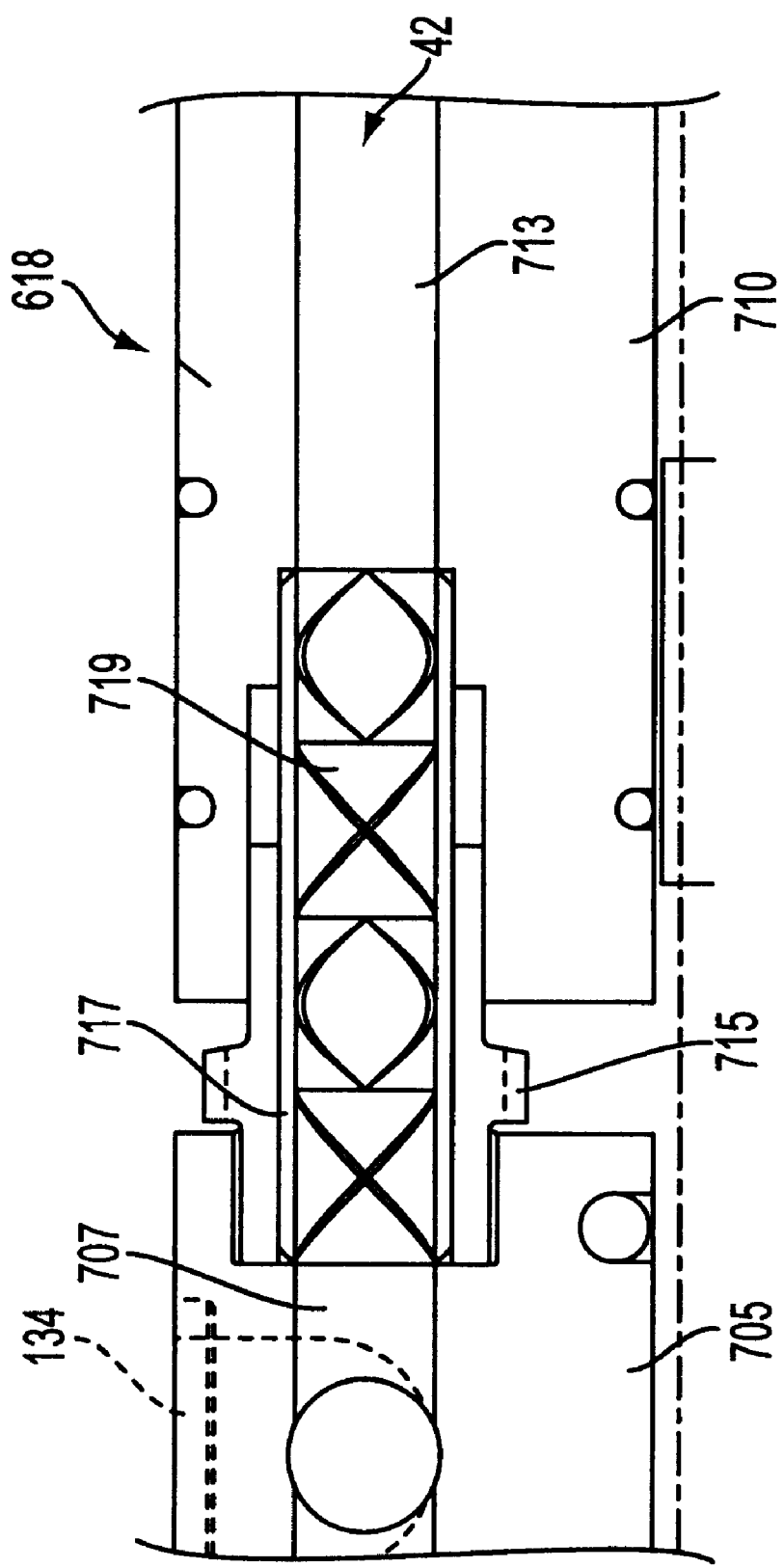
FIG. 9 is a partial cross-sectional view of an alternative front melt distribution manifold of the present invention.

FIG. 9 shows a partial view of another embodiment of a front melt distribution manifold 618 of the present invention. The front melt distribution manifold 618 is identical to, and operates in the same manner as, the front melt distribution manifold 18 described above and shown in FIGS. 1 and 8, with only a few exceptions. In order to avoid redundancy and unnecessary repetition, only the differences between the front melt distribution manifold 618 and the front melt distribution manifold 18 will be discussed in detail below.

As shown in FIG. 9, the front melt distribution manifold 618 comprises a bridge section 705, a sub-manifold section 710 spaced from the bridge section 705, and a melt link 715 joining the bridge section 705 and the sub-manifold section 710. The bridge section 705 has a bridge passage 707 in communication with the main melt passage 134 of the melt inlet nozzle 130, the sub-manifold section 710 has a sub-manifold passage 713 in communication with the first melt passage 42, and the melt link 715 has a link passage 717 in communication with both the bridge passage 707 and the sub-manifold passage 713. An example of a suitable melt link for use with the present invention is disclosed in U.S. Pat. No. 5,843,361, specifically incorporated herein by reference.

A conventional melt mixer 719 (or static mixer) is also positioned in the link passage 717, as shown in FIG. 9. During operation of the present invention, the use of PET for the preform material may generate a certain amount of undesirable acetaldehyde ("AA"). In addition, non-uniform shear stress may take place during the flow of the preform material or the barrier material through the melt channels of the manifolds and/or the nozzle. This non-uniform shear stress can create a non-uniform temperature distribution across the preform or barrier material, thereby creating difficulties with uniformly filling the cavity 36 with the preform and the barrier material. The melt mixer 719, however, addresses these problems and helps to prevent them from occurring or reduce their effects. Specifically, the melt mixer 719 helps reduce the amount of AA generated and improve the temperature uniformity across the material flow. Any of the melt mixers or static mixers known in the prior art may be adapted for use with the present invention. Examples of suitable melt mixers or static mixers are disclosed in U.S. Pat. No. 4,541,982, U.S. Pat. No. 4,965,028, U.S. Pat. No. 5,262,119, and Applicant's DE 3201710 application, all of which are specifically incorporated herein by reference.

Although a melt mixer is shown only in the link passage of the melt link for the front melt distribution manifold, it should be understood that melt mixers or static mixers may be used in a number of different locations throughout the apparatus of the present invention. For instance, a melt mixer may be positioned in a link passage of a melt link for the rear melt distribution manifold 94. In addition, melt mixers may be positioned in the transitional melt passages 84, 122 of the valve bushing 98 and/or in the radial melt channel 64 of the nozzle 10.

The apparatus and methods of the present invention may be applied with particular advantage to preforms and closures for bottles or containers. It should also be readily apparent from the forgoing description and accompanying drawings that the injection molding apparatus and method of the present invention are an improvement over the prior art. For instance, the apparatus and method of the present invention do not require multiple melt inlets, passages, channels, and gates. Instead, the apparatus and method of the present invention only uses two injection cylinders, two melt passages, and one gate to create three-layer preforms and closures. As a result, the present invention overcomes the disadvantages associated with the prior art injection molding devices and methods by providing a multi-layer injection molding apparatus and method that are relatively simple and inexpensive to both manufacture and operate.

The present invention also overcomes the disadvantages of the prior art injection molding devices and methods by surrounding the barrier material with hot preform material before injecting it into the cavity, thereby avoiding injection of the barrier material directly against a cooled portion of preform material previously disposed in the cavity. Consequently, the present invention provides a three-layer preform and closure with a more evenly and uniformly distributed barrier layer with better protection characteristics. Similarly, unlike the prior art, since the present invention injects the barrier material simultaneously with its surrounding hot preform material, rather than after first injecting hot preform material into the cavity, the cycle time for the preforms or closures is minimized and not increased.

As a modification of the valve-gated apparatus 5 shown in FIGS. 1–5 and described above, FIG. 10 shows a preferred embodiment of a portion of a back-flow preventing valve-gated injection molding apparatus 805 of the present invention. The apparatus 805 is identical to, and operates in the same manner as, the apparatus 5, with only a few exceptions. To avoid redundancy and unnecessary repetition, only the differences between the apparatus 805 and the apparatus 5 will be discussed in detail below. Similarly, for ease of illustration, only some of the components of the apparatus 805 are identified by reference numerals in FIG. 10.

Preferably, the non-identified components of the apparatus 805 are identical to the corresponding components of the apparatus 5. In addition, it should be understood that, like the apparatus 5, the apparatus 805 may be used to create both the bottle preform 170 and the closure 180 shown in FIGS. 6–7 and described above.

Figure 10:
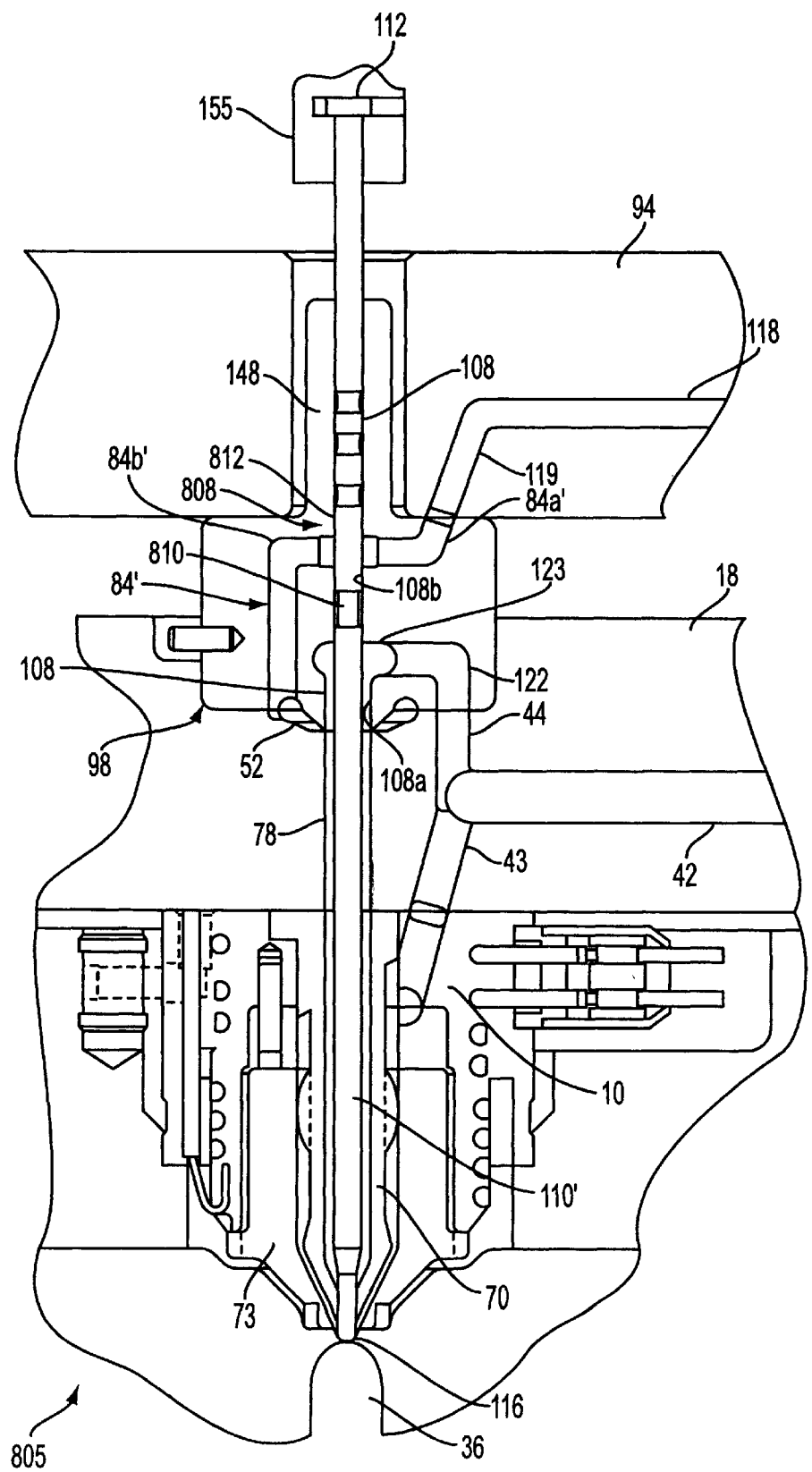
FIG. 10 is a cross-sectional view of a portion of a back-flow preventing valve-gated injection molding apparatus of the present invention for a multi-layer product.
Figure 12:
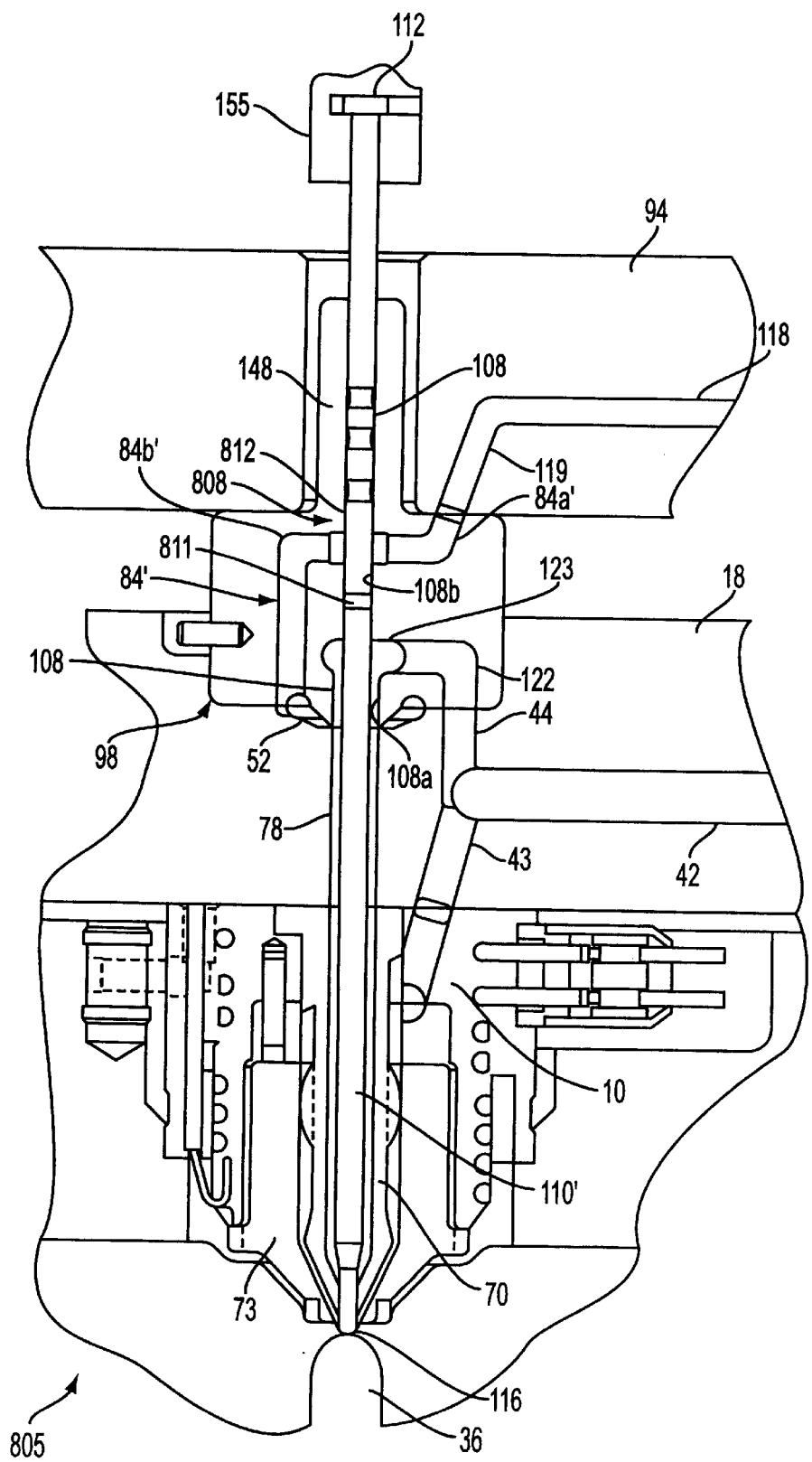
FIG. 12 is a cross-sectional view of a portion of an alternative back-flow preventing valve-gated injection molding apparatus of the present invention for a multi-layer product.

The primary difference between the apparatus 805 and the apparatus 5 is that the second transitional melt passage 84 and the valve pin 110 (or other valve member, such as a valve stem or valve sleeve) are modified so as to provide a back-flow control valve, disposed in the second transitional melt passage, for restricting or substantially preventing back-flow of preform material 200 into the second transitional melt passage. In particular, the modified second transitional melt passage 84' in the apparatus 805 crosses that portion of the central bore 108 having diameter 108b, and the modified valve pin 110' positioned within the central bore 108 passes through the second transitional melt passage 84'. Accordingly, the second transitional melt passage 84' includes a first section 84a' between L-shaped portion 119 and the central bore 108, and a second section 84b' between the central bore 108 and the annular ring channel 106. The modified valve pin 110' of the apparatus 805 divides the second transitional melt passage 84' into the first and second sections 84a', 84b', and also includes a narrow portion, preferably defined by a groove 810, and a wide portion 812, located next to the groove 810 opposite the nozzle 10, as shown in FIG. 10. It should be understood, however, that a slot or hole 811 may be used instead of the groove 810, as shown in FIG. 12.

Preferably, the modified valve pin 110' is otherwise identical to the valve pin 110 (or other valve member, such as a valve stem or valve sleeve). The diameter of the wide portion 812 is closely matched to diameter 108b to restrict or substantially prevent excess material from flowing backwards out of the central melt channel 78 along the valve pin 110'. Accordingly, when the wide portion 812 is interposed between the first section 84a' and the second section 84b', flow of material, including material 200 and material 300, from the first section 84a' to the second section 84b' and from the second section 84b' to the first section 84a' is restricted or substantially prevented. However, when the groove 810 (or slot/hole 811) is interposed between the first section 84a' and the second section 84b', flow of material 300 from the first section 84a' to the second section 84b' is permitted. In this arrangement, the valve pin 110' and the central bore 108 together define a valve 808 having a closed position, in which flow through the second transitional melt passage 84' is restricted or substantially prevented, and an open position, in which flow through the second transitional melt passage 84' is permitted.

As noted above with respect to the apparatus 5, the valve pin moves forward toward and backward away from the cavity 36 to control the flow of material 200 and material 300 into the cavity 36. In the apparatus 805, the location of the groove 810 is preferably such that this forward and backward motion of the valve pin 110' closes and opens the valve 808, respectively. The stages in the preferred operation of the valve 808 will now be described in more detail with particular reference to FIGS. 11A–D.

Shown in FIG. 11A is the first stage, in which the valve 808 is in the closed position. Specifically, the wide portion 812 is interposed between the first section 84a' and the second section 84b', thereby preventing flow through the second transitional melt passage 84'. This configuration shown in FIG. 11A occurs when the valve pin 110' is fully inserted through the front opening 74 of the nozzle gate seal 73, as shown in FIGS. 4A and 11A'. At this stage, the apparatus 805 is not injecting either material 200 or material 300 into the cavity 36, and the pressures in all melt passages and channels are preferably low. The melt passages and channels, however, may be filled with material from the previous molding cycle. For example, the central melt channel 78 may be filled with material 200, and the annular ring channel 106 and the second transitional melt passage 84' may be filled with material 300.

Shown in FIG. 11B is the next stage, in which the groove 810 has moved closer to the second transitional melt passage 84', but the valve 808 is still closed. This configuration shown in FIG. 11B occurs when the valve pin is pulled out of the front opening 74 of the nozzle gate seal 73, thereby allowing the first portion 200a of preform material 200 to fill the cavity 36, as shown in FIGS. 4B and 11B'. At this stage, the injection pressure applied to the main melt passage 134 may also cause the material 200 to flow into the central melt channel 78 from the first transitional melt passage 122. Advantageously, however, material 200 from the central melt channel 78 does not back-flow through the flow opening 109 into the annular ring channel 106 and the second transitional melt passage 84' because valve 808 is closed. In addition, since the diameter of the wide portion 812 of the valve pin 110' is preferably closely matched to the diameter 108b of the central bore 108, material in the central melt channel 78 is restricted or substantially prevented from flowing around the valve pin 110' backward toward the actuating mechanism 146.

Figures 11C, 11D:
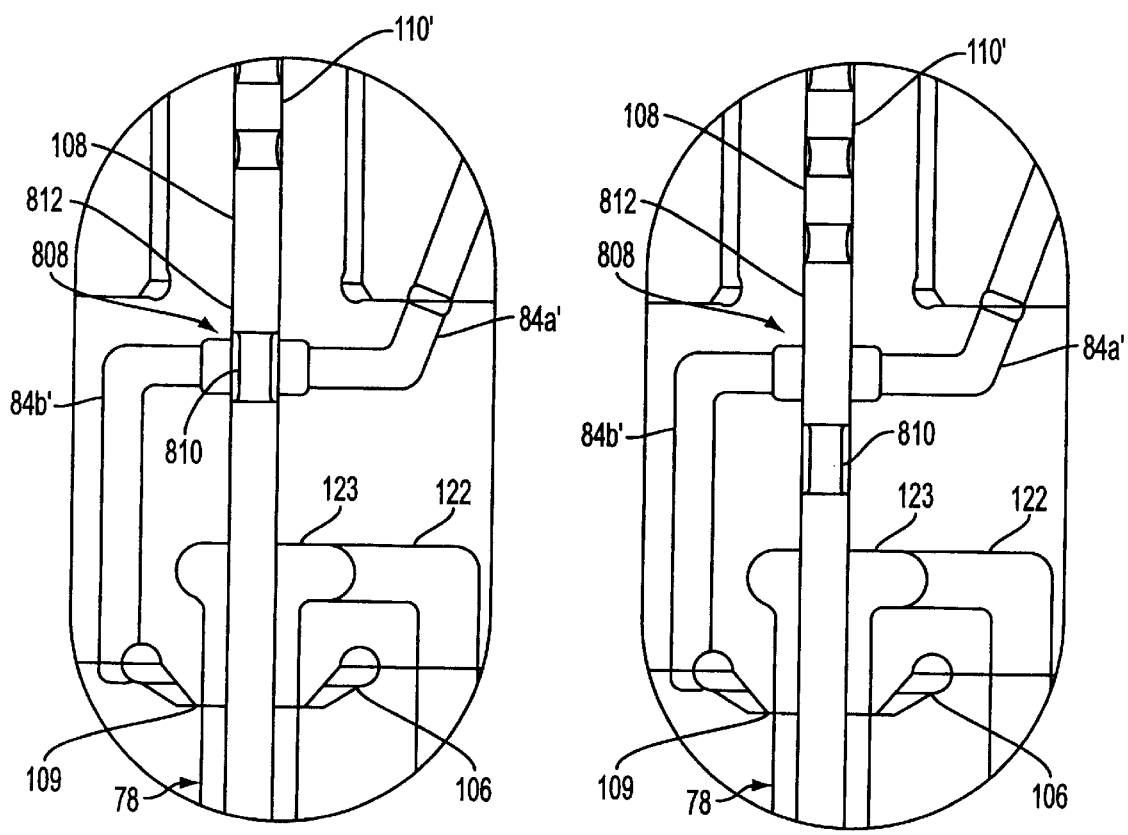
Figure 11C:
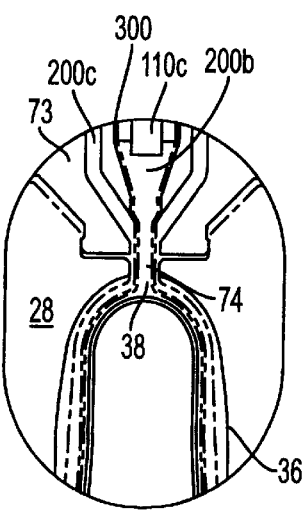
Figure 11D:
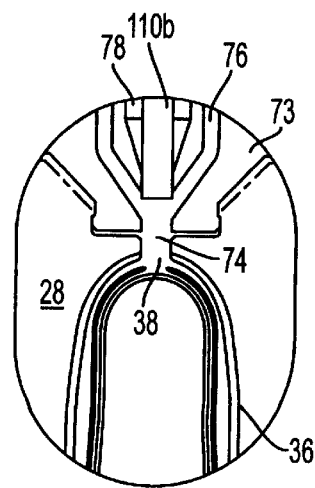

In the third stage, shown in FIG. 11C, the valve 808 is open, as the groove 810 is now interposed between the first section 84a' and the second section 84b'. This configuration shown in FIG. 11C occurs when the valve pin is pulled out of the front opening 75 of the liner sleeve 70, thereby allowing both material 200 and material 300 to fill the cavity 36, as shown in FIGS. 4C and 11C'. Advantageously, the valve 808 is open in this stage to allow the required flow of material 300 around the narrow portion (groove 810 or slot/hole 811) of the valve pin 110' and through the second transitional melt passage 84', i.e., from the first section 84a' to the second section 84b'.

In the next stage, shown in FIG. 11D, the valve 808 is again closed. This configuration occurs, when the valve pin again blocks the front opening 75 of the liner sleeve 70, but does not block the front opening 74 of the nozzle gate seal 73, thereby allowing material 200, but not material 300, to fill the cavity 36 (see, e.g., FIGS. 4D and 11D'). Accordingly, material 200 continues to flow through the first melt passage 42 and the central melt channel 78. However, because the valve 808 is closed, the material 200 does not back-flow through the second transitional melt passage 84'.

This synchronization between the control of material flow into the cavity 36 and the control of flow of material 300 through the second transitional melt passage allows for a simpler and more efficient design. Moreover, by preventing back-flow of material 200 into the channels and passages intended for material 300, more precise control over the molding process is enabled.

It should be understood that the back-flow control valve discussed above, especially its modified transitional melt passage and valve pin, may be used with injection molding apparatus other than the embodiments disclosed herein. For example, the back-flow control valve, with its modified transitional melt passage and valve pin, may be used with the injection molding apparatus for four-layer products disclosed in U.S. patent application Ser. No. 09/274,443, which has already been specifically incorporated in its entirety herein by reference. The back-flow control valve of the present invention may also be used with injection molding apparatus that have their transitional melt passage located in a melt distribution manifold rather than a valve bushing. Also, multiple back-flow control valves may be used with injection molding apparatus having multiple transitional melt passages. Accordingly, the back-flow control valve of the present invention should not be limited to the injection molding apparatus described herein.

Those skilled in the art to which the invention pertains may make modifications and other embodiments employing the principles of this invention without departing from its spirit or essential characteristics, particularly upon considering the foregoing teachings. For instance, the threads of the bottle preform and/or the closure may be eliminated entirely or replaced with some other fastening feature. In addition, any desirable shape and configuration may be used for the cavity and the resulting bottle preform and/or closure, depending on manufacturing and consumer preferences. Likewise, manufacturing and consumer preferences may also dictate the timing and number of cycles for the operation of the apparatus and methods of the present invention. Also, as noted above, rather than having a groove for its narrow portion, the modified valve pin may have a hole or slot instead to permit the flow of material through the second transitional melt passage. Accordingly, the described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. An injection molding apparatus comprising:

a nozzle with a front opening;

a first melt passage for flow of a first molten material, the first melt passage being positioned outside of the nozzle;

a melt channel for flow of the first molten material, the melt channel being in connection with the first melt passage and the front opening of the nozzle; and a unitary valve pin positioned in a central bore and passing through the first melt passage and the melt channel, the valve pin having a first portion, a second portion, and a third portion, the first portion allowing flow of the first molten material transversely across the valve pin and through the first melt passage, the second portion restricting flow of the first molten material through the first melt passage, and the third portion restricting flow of the first molten material out of the melt channel through the front opening of the nozzle;

wherein the valve pin divides the first melt passage into a first section for receiving the first molten material, and a second section in connection with the melt channel, the first portion of the valve pin allowing the first molten material from a the first section of the first melt passage to flow to the second section of the first melt passage, the second portion of the valve pin restricting the first molten material from the first section of the first melt passage to flow to the second section of the first melt passage and restricting he first molten material from the second section of the first melt passage to flow to the first section of the first melt passage; and wherein the central bore defines a portion of the melt channel and has a uniform diameter upstream of the melt channel.

2. The injection molding apparatus of claim 1 further comprising a flow control valve defined at least in part by the first and second portions of the valve pin, the flow control valve having an open position to allow flow of the first molten material through the first melt passage, and a closed position to restrict flow of the first molten material through the first melt passage.

3. The injection molding apparatus of claim 1 further comprising a second melt passage in connection with the melt channel for flow of a second molten material.

4. The injection molding apparatus of claim 3 wherein the central bore of the melt channel has a diameter to allow for simultaneous flow of the first molten material and the second molten material.

5. The injection molding apparatus of claim 4 wherein the diameter of the central bore allows the first molten material and the second molten material to flow side-by-side in the melt channel.

6. The injection molding apparatus of claim 3 wherein the second portion of the valve pin restricts the second molten material from flowing through the first melt passage.

7. The injection molding apparatus of claim 1 wherein the valve pin passes through the first melt passage in a valve bushing.

8. The injection molding apparatus of claim 1 wherein the first portion of the valve pin comprises one of a groove, a hole, and a slot.

9. In combination with a nozzle and a separate melt passage of an injection molding apparatus, a unitary flow control valve member positioned in a central bore and comprising:

a first portion for allowing flow of material transversely across the flow control valve member and through the melt passage;

a second portion for restricting flow of material through the melt passage; and a third portion for restricting flow of material out of the nozzle;

wherein the flow control valve member divides the melt passage into a first section and a second section, the first portion allowing flow of material from the first section to the second section, the second portion restricting flow of material from the first section to the second section and from the second section to the first section;

wherein the melt passage is in connection with a melt channel; and wherein the central bore defines a portion of the melt channel and has a uniform diameter upstream of the melt channel.

10. The flow control valve member of claim 9 wherein the first portion is one of a groove, a hole, and a slot.

11. A method for injection molding comprising the steps of:

injecting a first material into a first melt passage having a first section and a second section;

positioning a unitary valve pin in a central bore;

positioning a first portion of the valve pin between the first and second sections to allow flow of the first material transversely across the valve pin through the first melt passage;

positioning a second portion of the valve pin between the first and second sections to restrict flow of the first material through the first melt passage; and positioning a third portion of the valve pin in an opening of a nozzle to restrict flow of the first material out of the nozzle;

wherein the central bore defines a portion of a melt channel and has a uniform diameter upstream of the melt channel.

12. The method of claim 11 further comprising the step of injecting a second material into a second melt passage in connection with the melt channel.

13. The method of claim 12 further comprising the step of restricting flow of the second material through the first melt passage with the second portion of the valve pin.

14. The method of claim 11 further comprising the step of providing one of a groove, a hole, and a slot for the first portion of the valve pin.

15. The method of claim 11 further comprising the step of positioning the first portion of the valve pin within a valve bushing.

16. An injection molding apparatus comprising:

a manifold having at least a portion of a first melt passage;

a nozzle having a melt channel in connection with the first melt passage;

a cavity aligned with the melt channel of the nozzle; and a unitary valve member positioned in a central bore and having a first portion for allowing flow of material transversely across the valve member and through the first melt passage, a second portion for restricting flow of material through the first melt passage, and a third portion for restricting flow of material from the melt channel into the cavity;

wherein the valve member passes through and divides the first melt passage into a first section and a second section in connection with the melt channel, the second portion of the valve member restricting flow of material between the first and second sections of the first melt passage; and wherein the central bore defines a portion of the melt channel and has a uniform diameter upstream of the melt channel.

17. The injection molding apparatus of claim 16 wherein the first portion of the valve member is one of a groove, a slot, and a hole.

18. The injection molding apparatus of claim 16 wherein the valve member is positioned within the melt channel.

19. The injection molding apparatus of claim 3 further comprising the third portion restricting flow of the second molten material out of the melt channel through the front opening of the nozzle.

20. The method of claim 11 further comprising the step of positioning the third portion of the valve pin in the opening of the nozzle to restrict flow of the second material out of the nozzle.

* * * * *